Aug. 4, 1970 J. H. DAVIS 3,522,599

NONLINEAR GRAY ENCODER USING PIECEWISE LINEAR COMPRESSION

Filed July 3, 1967 5 Sheets-Sheet 1

INVENTOR
J. H. DAVIS
BY John P. Mc Donnell
ATTORNEY

Aug. 4, 1970 J. H. DAVIS 3,522,599

NONLINEAR GRAY ENCODER USING PIECEWISE LINEAR COMPRESSION

Filed July 3, 1967 5 Sheets-Sheet 2

United States Patent Office

3,522,599
Patented Aug. 4, 1970

3,522,599

NONLINEAR GRAY ENCODER USING PIECEWISE LINEAR COMPRESSION

John H. Davis, Fair Haven, N.J., assignor to Bell Telephone Laboratories, Incorporated, Murray Hill, N.J., a corporation of New York

Filed July 3, 1967, Ser. No. 650,675
Int. Cl. H03k *13/02*
U.S. Cl. 340—347 7 Claims

ABSTRACT OF THE DISCLOSURE

Non-linear encoding of analog signals into a Gray binary code to approximate any desired companding curve of monotonically increasing or decreasing slope with linear segments is accomplished with a stage-by-stage encoder. The stage gain of selected stages is switched to produce the proper segment slopes in accordance with the combination of digit outputs from the previous stages. Particular values are given for optimum companding of signals with Gaussian amplitude distribution.

BACKGROUND OF THE INVENTION

This invention relates to the art of transmitting electric signals by pulse code modulation techniques, and particularly to nonlinear encoding.

With pulse code modulation, the analog signal to be transmitted is sampled at a rate at least equal to twice the frequency of its highest component, and the amplitude of each sample is encoded, that is, translated into a digital code word containing pulses of equal amplitude. At a repeater station, although the pulses have suffered considerable distortion from transmission over a distance, they may be easily reconstituted in their original form as long as the pulse spacing is recognizable. As a consequence, transmission over very long distances requiring many repeaters introduces very little noise and distortion.

The major sources of noise, instead, are overload noise and quantizing noise. The former is the noise that results when the input signal amplitude exceeds the nominal maximum encoder input. The latter is the noise that results from dividing the analog amplitude samples into discrete steps for digital encoding. The more steps that are used, the smaller each step is and, hence, the smaller the average error or quantizing noise. On the other hand, more quantizing steps require more digits to the code word, hence a larger bandwidth for transmission.

One method of increasing the accuracy of practical encoders without increasing bandwidth is the use of the reflected binary, or Gray, code (see U.S. Pat. 2,632,058 which issued to F. Gray, Mar. 17, 1953). In the process of counting by this code, any two successive code words differ in one digit only. Consequently, a resolution error of any one digit in encoding or decoding is equivalent to an error in the least significant digit. Further improvement in the signal-to-noise ratio for a given bandwidth can be realized by varying the relative sizes of the quantizing steps through companding. Companding is, of course, old in the electric signal transmission art, and signals have been compandored with square law, logarithmic and hyperbolic characteristics. The optimum shape of a companding characteristic for transmitting pulse code modulation signals to minimize quantizing noise is one that results in an equal occurrence of all possible code words. The optimum compression characteristic of an encoder, therefore, depends upon the amplitude distribution of the analog signals.

When many voice signals are simultaneously transmitted over a single channel through frequency division multiplex techniques, such as the L-type master group (which may carry as many as 600 voice signals) the distribution of the combined signal amplitudes follows a Gaussian curve. If a companding characteristic of optimum shape for such Gaussian signals were to be applied to an 8-digit Gray pulse code, it can be shown that the signal to quantizing noise ratio theoretically could be improved by 3.4 db. An equivalent improvement without companding would require an extra 0.6 digit. It may be possible, therefore, to use an 8-digit code with companding in place of a 9-digit code without companding, resulting in considerable bandwidth saving.

No convenient method has heretofore been shown, however, for physically applying a companding characteristic to a Gray code. It is, of course, possible to compress and expand the analog signal separate from the encoding and decoding operation. This gives rise, however, to serious tracking error which may generate more noise than companding eliminates. Furthermore, the particular curve shape sought may not be easy to physically realize, while those readily producible may yield insufficient improvement. For Gaussian signals, practical logarithmic companding yields only about 1.6 db improvement.

C. P. Villars (see U.S. Pat. 3,016,528 issued Jan. 9, 1962) and H. Mann (U.S. Pat. 3,015,815 issued Jan. 2, 1962) have disclosed methods and apparatus for combining compressing with encoding in a binary code to provide nonlinear encoding. These patents teach the approximation of any desired compression characteristic by several successive linear regions. The advantages of coding accuracy, simplicity of linear systems, and ability to approximate any companding curve are not to be disputed for such piecewise linear systems. The stage-by-stage development of a Gray code differs considerably from that of the binary code, however, and those circuits cannot be used to generate a Gray code.

An object of the present invention is to provide a simple and accurate Gray encoder with built-in compression on a piecewise linear basis.

Another object is to approximate optimum compression for Gaussian signals.

A further object is to provide an 8-segment compression characteristic with only two nonsymmetrical encoding stages.

SUMMARY

Compression is added to encoding with a Gray binary code in a stage-by-stage encoder through the provision of a plurality of alternative gain values in at least two stages after the first stage. The number of gain values of the *i*th stage is given by the expression $2^{i-2}+1$, the particular one of said gain values being determined by switching means responsive to the digit outputs of each stage preceding the *i*th stage after the first stage.

DETAILED DESCRIPTION

Figure 1:
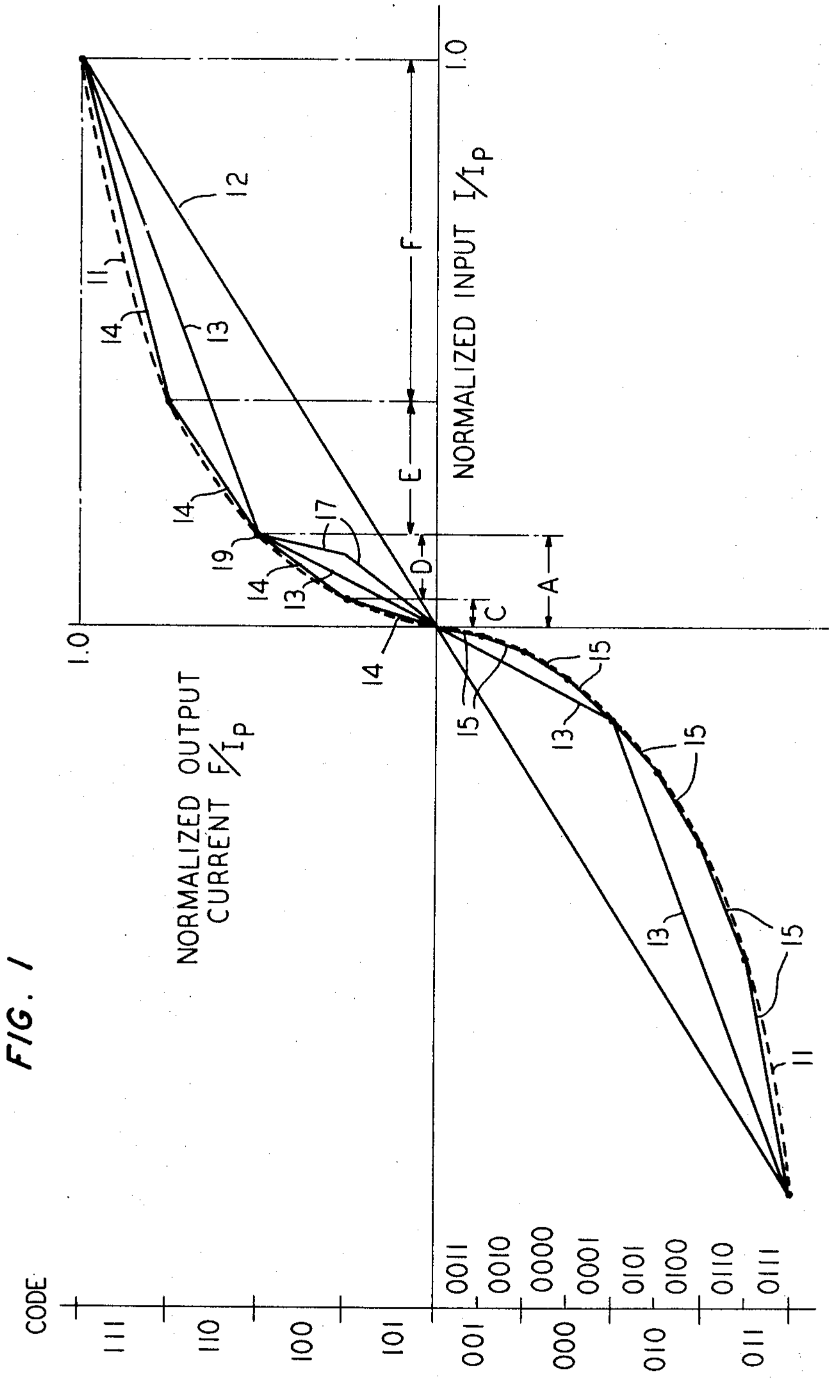
FIG. 1 is an ideal companding curve to be embodied in the encoding process and several piecewise linear approximations thereof.

A companding characteristic which it is desired to approximate in the process of encoding with a Gray code is shown as dotted curve 11 in FIG. 1. The abscissa represents the analog sample current to be encoded, and the ordinate represents the analog number which literally translates into the code word. Both scales have been normalized by dividing by the maximum current which the system will handle without overload, $I_p$, so that full scale is equal to one.

Figure 2:
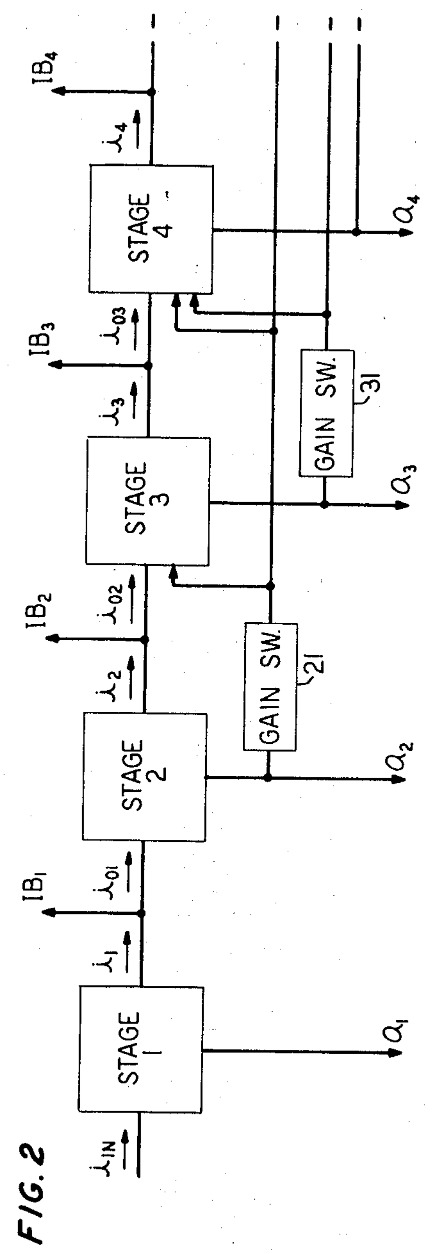
FIG. 2 is a block diagram of a stage-by-stage encoder according to the invention.

According to the principles of the invention, companding curve 11 can be approximated by an encoder as shown in block form in FIG. 2. The present invention is not necessarily limited to this particular curve; any curve of monotonically increasing or decreasing slope and zero axis symmetry may be so approximated.

The encoder of FIG. 2 is a typical stage-by-stage encoder, well-known for its speed and accuracy, with the addition of switches to change stage gain values. Stage-by-stage encoders are made-up, as the nomenclature would suggest, of several stages connected in tandem, one stage for each digit of a code word. Each stage includes an analog input into an amplifier, an analog output, and a digit output. All the digits, taken sequentially, form the code word. A bias current is withdrawn from the junction betwen the analog output of one stage and the analog input of the following stage. The polarity of the input signal to each stage determines whether the digit output of that stage is one or zero and hence whether that particular space in the code word is taken by an ON pulse or an OFF pulse. For the purpose of illustration, we will assume that a negative signal input to any stage will produce a zero digit and a positive input, a one digit. Thus, a current $i_{in}$ representative of the analog sample voltage whose magnitude is to be coded, is amplified in stage one by a specific gain value to produce analog output current $i_1$. A bias current $I_{B1}$ is subtracted from $i_1$ to produce $i_{01}$, the input to stage two. If $i_{in}$ is greater than zero, digit $a_1$ is one; if $i_{in}$ is less than zero, digit $a_1$ is zero. Likewise, if $i_1$ minus $I_{B1}$ is greater than 1, digit $a_2$ is one, and so on through the entire code word, $a_1$, $a_2$, $a_3$, $a_4$. etc.

Figure 3:
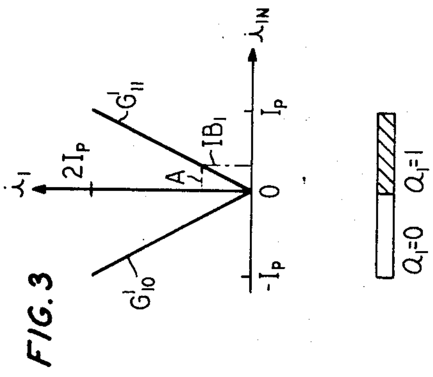
FIG. 3 is the gain characteristic of a standard Gray encoding stage.

In a linear Gray encoder, the gain characteristic of each stage is that shown in FIG. 3. Whether the current input to the stage is positive or negative, the output is always positive and the sage gain has an absolute value of two. In such a system, the bias current subtracted between stages is equal to the peak input current, $I_p$. If all stages had the standard characteristic of FIG. 3, the overall encoding characteristic would be a straight line through the origin and points (1, 1) and (−1, −1) which is shown as curve 12 of FIG. 1. In order to approximate a curve with linear segments of differing slopes, some stages must be modified to provide nonstandard gain values. If $n$ is the number of stages so modified, the number of linear segments in each half of the companding curve is given by $2^n$. Since our code is of the base two, and each stage produces one digit of a code word, each stage which is properly modified serves to break each existing linear curve segment at its vertical midpoint. Therefore, starting with standard stage 1, which produces straight line curve 12, proper modification of stage 2 produces the two linear segments 13, 13; additional modification of stage 3 produces the four segments, 14, 14; and of stage 4, the eight segments 15, 15. In FIG. 1, segments 14 and 15 have been shown in one quadrant each, for detail clarity; they would be formed, of course, in both quadrants.

Additional standard stages, similar to stage 1, serve to provide additional encoding steps, but do not provide more curve break points. Thus to approximate curve 11 with four linear segments per quadrant, only the second and third stages of such an encoder need be modified; the first, fourth, fifth, sixth, seventh and eighth stages of an 8-digit encoder would have the exact characteristics shown in FIG. 3.

It has been found that in order to produce the required segment slopes, the affected stages must provide more than one absolute gain value. The number of different gain values for each modified stage is given by the expressions $2^{i-2}+1$ where $i$ is the numerical order of the stage.

In other words, the second stage amplified must supply two alternate gain values; the third sage, three; the fourth, five; and fifth, nine; and so on, depending upon the desired number of linear curve segments. Failure to provide the additional gain values restricts the position of break points so that they cannot all fall on the curve. Segments 17—17, as they deviate from 14—14, of FIG. 1 represent the optimum approximation of curve 11 with only two gain values in stage 3.

The particular value of gain to be applied to a signal in a given modified stage in the encoding chain depends upon the polarity of the signal into the stage in question and the digit outputs of the pervious stages. This fact allows the nonlinear encoder to be fast and accurate, as is the linear encoder, for the required gain switching information is developed before the signal to be switched.

Figure 4:
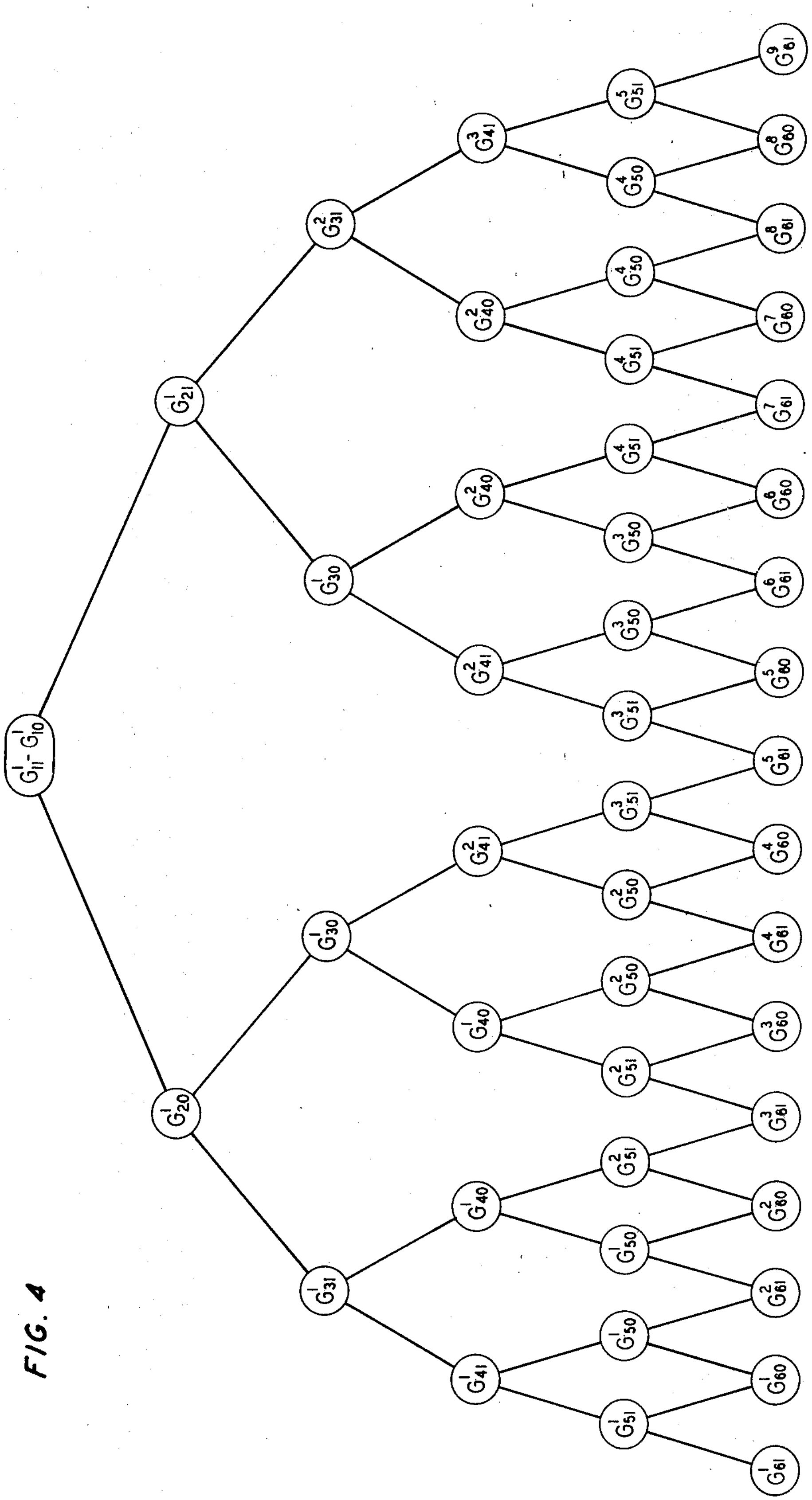
FIG. 4 is a table of the various stage gains.

The table of FIG. 4 illustrates the relationship between digits and gain values. Each value of gain is given by the letter G with an appropriate subscript and superscript. The first figure of each subscript represents the stage and the second figure the digit state (zero or one). Superscripts denote different gain values of the same stage and digit state. The particular gain value chosen for each stage is derived from that most nearly above it on the table. Thus, if digit 2 was zero, digit 3 zero, and digit 4 one, a negative input to stage 5 would enable gain $G^2{}_{50}$, a positive input $G^3{}_{51}$. Likewise, if digit 2 was one, digit 3 zero, digit 4 zero and digit 5 one, a negative input to stage 6 would enable gain $G^6{}_{60}$ and a positive input $G^7{}_{61}$. A pattern is, of course, recognizable, and anyone could easily construct stage 7 if it was desired. Since the analog output is the same from stage 1 for both positive and negative input signals, the first digit does not determine subsequent gain values. Thus, as shown in FIG. 2, a gain switch 21 is made operative by the stage 2 digit output $a_2$ to change the gain of stages 3 and 4. A gain switch 31, made operative by the stage 3 digit output $a_3$, operates to change the gain of stage 4. Similarly, both switches 21 and 22 operate to change the gain of each subsequent nonstandard stage required to produce the desired number of curve breakpoints.

Figure 5:
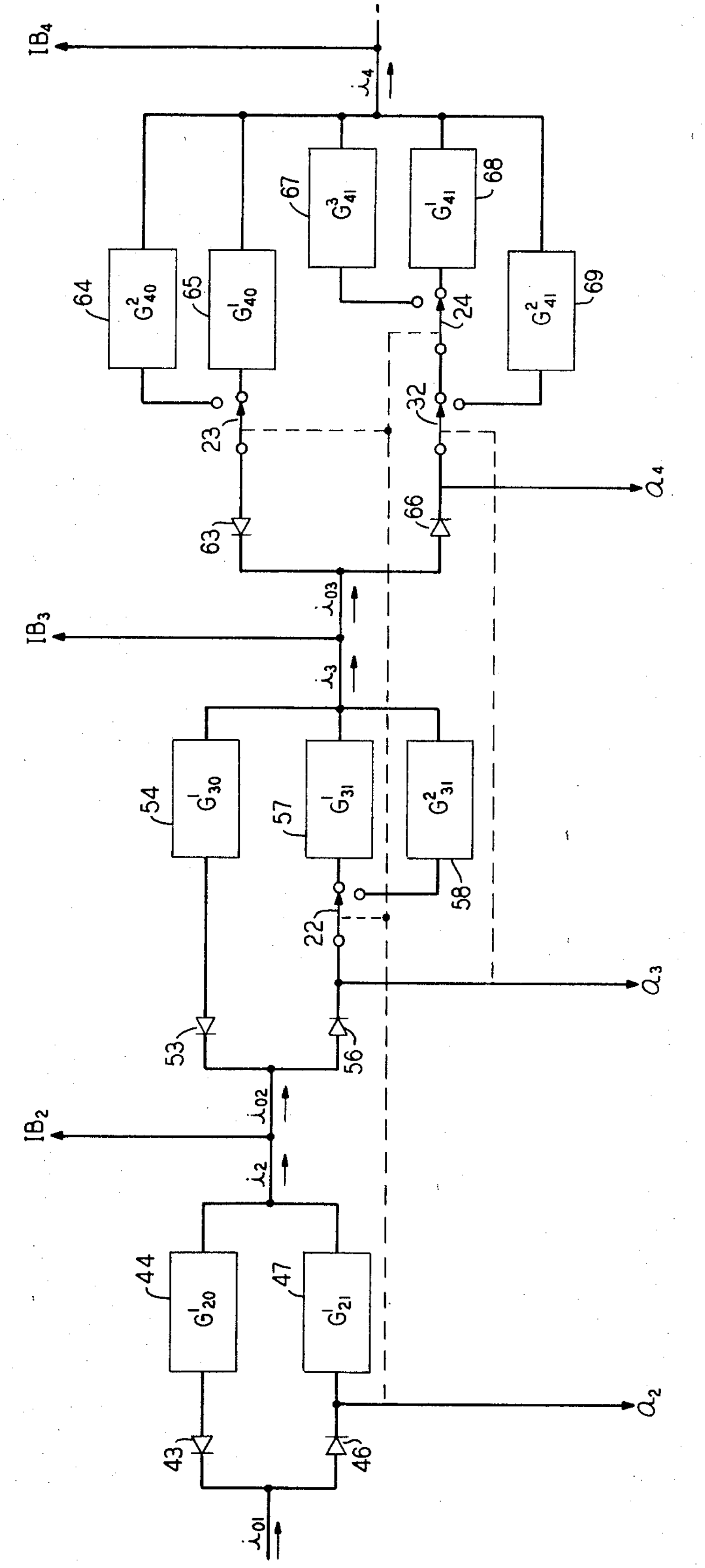
FIG. 5 is a block diagram showing the stage gain switching according to the invention.

One arrangement of switches according to the invention is shown in FIG. 5. In stage 2, a diode 43, poled to pass negative input currents, connects the second stage input signal $i_{01}$ to an amplifier 44 whose gain is $G^1{}_{20}$. An oppositely poled diode 46 connects signals $i_{01}$ to an amplifier 47 whose gain is $G^1{}_{21}$. The output signals of amplifiers 44 and 47 are joined to form stage 2 output current $i_2$. Bias current $IB_2$ is withdrawn from current $i_2$ to produce the input current stage 3, $i_{02}$. Similarly, in stage 3, a diode 53 poled to pass negative input currents, connects signal $i_{02}$ to an amplifier 54 whose gain is $G^1{}_{30}$. An oppositely poled diode 56 connects signal $i_{02}$ to a switch 22. In its normally closed position, switch 22 connects diode 56 to an amplifier 57 whose gain is $G^1{}_{31}$, and in its normally open position, to an amplifier 58 whose gain is $G^2{}_{31}$. The output signals from amplifiers 54, 57 and 58 are joined to produce stage 3 output current $i_3$. Bias current $IB_3$ is subtracted from signal $i_3$ to produce the input signal to stage 4, $i_{03}$. A diode 63 poled to pass negative input currents connects signal $i_{03}$ to a switch 23, which is in turn connected in its normally closed position to an amplifier 65 whose gain is $G^1{}_{40}$, and, in its normally open position, to an amplifier 64 whose gain is $G^2{}_{40}$. An oppositely poled diode 66 connects signal $i_{03}$ to a switch 32 which is, in turn, connected in its normally closed position to another switch 24, and in its normally open position, to an amplifier 69 whose gain is $G^2{}_{41}$. Switch 24, in its normally closed position, is connected to an amplifier 68 whose gain is $G^1{}_{41}$, and, in its normally open position, to an amplifier 67 whose gain is $G^3{}_{41}$. The outputs of amplifiers 64, 65, 67, 68 and 69 are joined to produce the output signal of stage 4· $i_4$.

When the input current to stage 2, $i_{01}$, is positive, digit $a_2$ is 1 and switches 22, 23 and 24 all operate. Likewise, when current $i_{02}$ is positive, digit $a_3$ is 1 and switch 32 operates. It can be seen, therefore, that when digit 2 is 1 and digit 3 is 1, a positive signal to stage 4, $i_3$, is operated upon by gain $G^2_{41}$ and a negative signal is operated upon by $G^2_{40}$. All of the other combinations can likewise be worked out. It is not necessary, of course, that the amplifiers shown for each stage be completely separate amplifiers. It is only the gain which must be switched, as well as the polarity.

Figure 6:
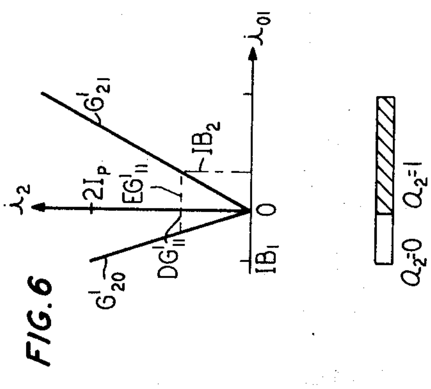
FIG. 6 is the gain characteristic of stage 2.

The bias currents and gain values required to encode with any desired companding curve of monotonically increasing or decreasing slope and zero axis symmetry may be readily calculated knowing the abscissas of the break points in the companding curve. For illustration, the biases and gain values of the first three stages of an encoder will be developed with reference to the stage characteristics shown in FIGS. 3, 6 and 7. The ordinates of the break points, of course, are constrained to occur at the affected digit transition points. The first break point, therefore, occurs at the point where the second digit changes from zero to one, hence at the vertical midpoint of the companding curve, point 19 of FIG. 1. If we let A equal the horizontal projection of the curve 11 between the origin and point 19, bias current $IB_1$, which determines digit 2 transition point 19, is given by the expression $IB_1=G^1_{11}A=2A$, as is evident from FIG. 3. In order to make zero input current produce $i_2=2I_p$, from FIG 6, we see that $G^1_{20}=2I_p/IB_1$, hence $I_p/A$. Let us for convenience let the horizontal projections of the four segments 14—14 of FIG. 1 equal C, D, E and F respectively, proceeding from the origin. $IB_2$, the bias which sets the 3rd digit transition point then becomes $$IB_2=G^1_{11}\times D\times G^1_{20}=2DI_p/A \quad (1)$$

This may also be expressed $$IB_2=G^1_{11}\times E\times G^1_{21} \quad (2)$$

hence $$G^1_{21}=DI_p/AE \quad (3)$$

Figure 7:
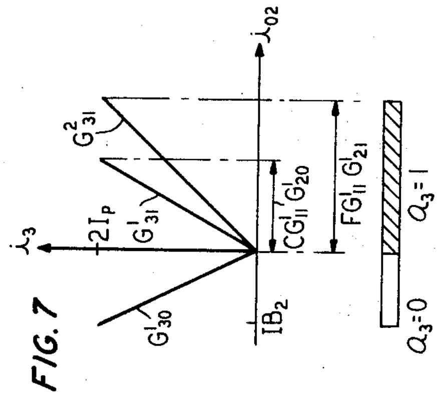
FIG. 7 is the gain characteristic of stage 3.

From FIG. 7, the characteristic of stage 3, we can determine that $$G^1_{30}=\frac{2I_p}{IB_2}=\frac{A}{D} \quad (4)$$

and $$G^1_{31}=\frac{2I_p}{C\times G^1_{11}\times G^1_{20}}=\frac{A}{C} \quad (5)$$

Finally, $$G^2_{31}=\frac{2I_p}{F\times G^1_{11}\times G^1_{21}}=\frac{AE}{DF} \quad (6)$$

If stage 4 is to be nonstandard, the values can be worked out in a similar manner. If only four segments per quadrant are required, however, $IB_3$ will be $I_p$ and $G^1_{41}$ and $G^1_{40}$ will both be 2. It can be shown that the optimum four-segment companding curve for input signals of Gaussian amplitude distribution with zero mean by this method yields the following values:

$$IB_1=.577I_p;\ G^1_{20}=3.48;\ G^1_{30}=1.875$$

$$IB_2=1.068I_p;\ G^1_{21}=2.47;\ G^1_{31}=.816$$

$$G^2_{31}=2.145$$

For the purpose of calculating these values, the overload current was taken as 4.6 times the RMS current. The exact ratio of overload to RMS current is not critical, but it can be shown that a ratio of approximately 4.6 results in the optimum companding curve (i.e., the one that minimizes noise caused by quantizing and overload).

Figure 8:
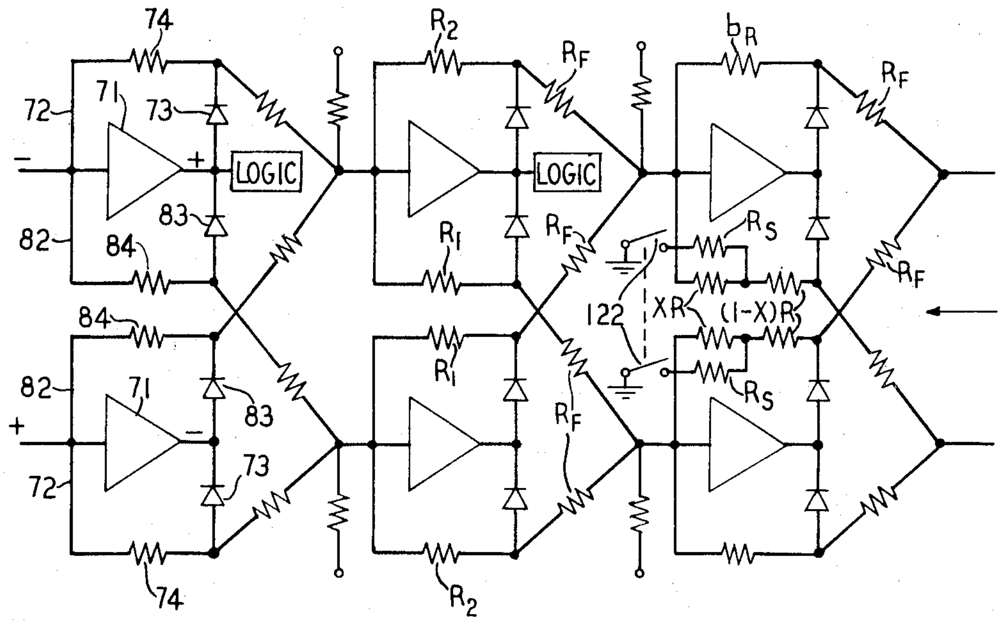
FIG.8 is a circuit diagram of a practical embodiment of the invention.

A practical encoder embracing the invention is shown in FIG. 8. Three stages of the type described in U.S. Pat. 3,187,325 which issued to F. D. Waldhauer on June 1, 1965, are presented. Each stage includes two very high gain operational amplifiers 71—71, in a balanced rail arrangement. The first stage gain is determined for negative signals by a feedback path 72 around each amplifier which comprises a properly poled diode 73 in series with a resistor 74. The stage gain for positive signals is determined by a similar feedback path 82 which comprises an oppositely poled diode 83 in series with a resistor 84. The digit output is taken at the output of the amplifier and the analog output from the junction of diode and resistor in each feedback path. The positive analog outputs of both amplifiers are added together and the negative analog output of both amplifiers are added together to drive the next stage.

To provide the different gains required of stage 2 of a nonlinear encoder, it is only necessary to adjust the feedback resistors according to principles well-known in the art; the stage gain is equal to the ratio of feedback resistance to feed forward resistance. If, therefore, the feedback resistance for positive signals is $R_1$ and that for negative signals is $R_2$ and the resistance connecting each feedback resistor diode junction to the following stage input is $R_F$, $$G^1_{20}=R_2/R_F \text{ and } G^1_{21}=R_1/R_F \quad (7)$$

In stage three, the feedback resistance for positive signals is divided into two resistors of the value $xR$ and $(1-x)R$. A double switch 122, connects the junction point of each feedback resistor pair to ground through an additional resistance $R_s$ when digit 2 is one. The feedback resistance for negative signals is given as $bR$. The various gain values then are:

$$G^1_{30}=bR/R_F \qquad G^1_{31}=R/R_F \quad (8)$$

$$G^2_{31}=(1-x)\left(1+\times\frac{R}{RS}\right)\frac{R}{R_F} \quad (9)$$

Figure 9:
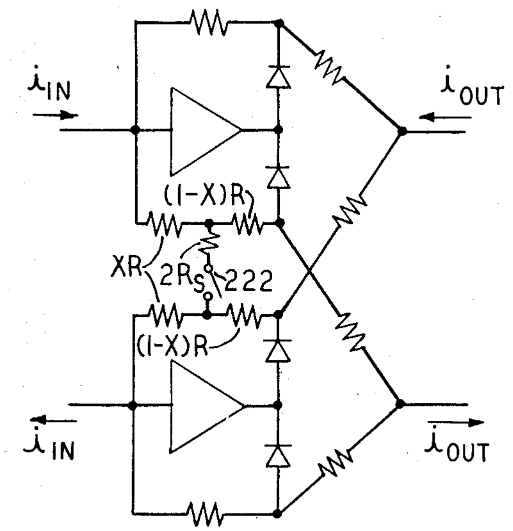
FIG. 9 is a circuit diagram of another embodiment of stage 3.

An alternative arrangement for stage three is shown in FIG. 9. In this case, the feedback resistance for positive signals of each amplifier is again broken into two parts, xR and $(1-x)R$. A single switch 222 connects the junction between the two parts of one amplifier feedback path with that of the other through a resistance $2R_s$. The stage gain values are numerically the same as in the embodiment of FIG. 8. While the switch of FIG. 8 may be grounded, and that of FIG. 9 may not, the latter is probably more advantageous because residual switch voltage does not unbalance the rails.

Switches 122 and 222 may be any of the various high-speed switching devices in common use in the data transmission art. For example, they may consist of a bi-stable flip-flop to receive the digit pulse and to bias a transistor into conduction. Suitable devices can also be designed by those skilled in the art using tunnel diodes.

The value of parameter x is chosen according to practical considerations. If x is very small, any residual switch voltage causes a relatively large error current, but if $x$ is too close to unity the value of $2R_s$ becomes very critical in setting the gain $G^2_{31}$. When $R=490\Omega$, $R_f=600\Omega$, $I_p=3.33$ ma., the residual switch voltage is 1.0 mv. and the variation in $R_s$ is $\pm.01$, the optimum value for $x$ is about 0.35.

The above described arrangements are illustrative of the principle of the invention. Other embodiments can be devised by persons skilled in the art without departing from the spirit and scope of the invention.

What is claimed is:

1. Encoding apparatus for translating in a nonlinear manner an instantaneous sample of an analog signal into a group of binary digits of a reflected binary code comprising a plurality of amplifying stages connected in tandem, each stage being adapted to receive an analog input signal and to produce an analog output signal and either a first or a second digit output, a bias current injected into the junction between the analog output of each stage and the analog input of the following stage, said plurality of amylifying stages including at least two asymmetrical stages each adapted to amplify its input signal by a number of predetermined alternative absolute gain values, said number for each stage after the first stage being given by the expression $2^{i-2}+1$, where $i$ is the numerical order of the stage, and switching means connected to at least one of said one asymmetrical stage in response to the digit outputs of each preceding stage after the fist stage.

2. Encoding apparatus as in claim 1 wherein said first stage operates with a first absolute gain value for both said first and second digit outputs, the second stage operates with a second gain value for a first digit output and with a third gain value for a second digit output, and the third stage operates with a fourth gain value for a first digit output, a fifth gain value for a second digit output from said third stage and a first digit output from said second stage, and a sixth gain value for a second digit output from said third stage and a second digit output from said second stage.

3. Encoding apparatus as in claim 2, wherein a fourth stage operates with a seventh gain value for a first digit output from said fourth stage and a first digit output from said second stage, an eighth gain value for a first digit output from said fourth stage and a second digit output from said second stage, a ninth gain value for a second digit output from said fourth stage and a first digit output from said second stage, a tenth gain value for a second digit output from said fourth stage with a second digit output from said second stage and a first digit output from said third stage, and an eleventh gain value for a second digit output from said fourth stage with a second digit output from both said second and third stages.

4. Encoding apparatus as in claim 2 wherein said switching means changes the gain of said third stage in response to a second digit output from said second stage.

5. Encoding apparatus as in claim 4 wherein said gain values are each determined by a feedback path around the respective amplifier comprising resistance means and unidirectional conducting means, said analog output signal being taken from the junction between said resistance means and said unidirectional conducting means, and said switching means selectively connects a particular one of said feedback paths.

6. Encoding apparatus as in claim 5 wherein said third stage includes two amplifiers, the positive and negative analog outputs of one amplifier being connected to the positive and negative outputs of the other amplifier, respectively, and said switching means selectively connects the feedback paths of both amplifiers individually.

7. Encoding apparatus as in claim 5 wherein said third stage includes two amplifiers, the positive and negative analog outputs of one amplifier being connected to the positive and negative outputs of the other amplifier, respectively, and said switching means connects the operative feedback path of one amplifier with that of the other.

References Cited

UNITED STATES PATENTS

| | | | |
|---|---|---|---|
| 3,100,298 | 8/1963 | Fluhr | 340—347 |
| 3,161,868 | 12/1964 | Waldhauer | 340—347 |
| 3,255,447 | 6/1966 | Sharples | 340—347 |
| 3,329,950 | 7/1967 | Shafer | 340—347 |
| 3,447,146 | 5/1969 | Saari | 340—347 |

MAYNARD R. WILBUR, Primary Examiner

C. D. MILLER, Assistant Examiner

U.S. Cl. X.R.

179—15.55

UNITED STATES PATENT OFFICE
CERTIFICATE OF CORRECTION

Patent No. 3,522,599 Dated August 4, 1970

Inventor(s) John H. Davis

It is certified that error appears in the above-identified patent and that said Letters Patent are hereby corrected as shown below:

Column 7, line 1, at the beginning of the line, the word "amylifying" should be corrected to read --amplifying--.

Also in column 7, at line 7, after "said" insert --asymmetrical stages for selecting the gain value of said--.

Signed and sealed this 11th day of May 1971.

(SEAL)
Attest:

EDWARD M.FLETCHER,JR.
Attesting Officer

WILLIAM E. SCHUYLER, JR.
Commissioner of Patents